Jan. 7, 1958     E. A. FIELD     2,819,024
VARIABLY COUNTERBALANCED DRAFT REGULATOR GATE
Filed Jan. 15, 1957     2 Sheets-Sheet 1
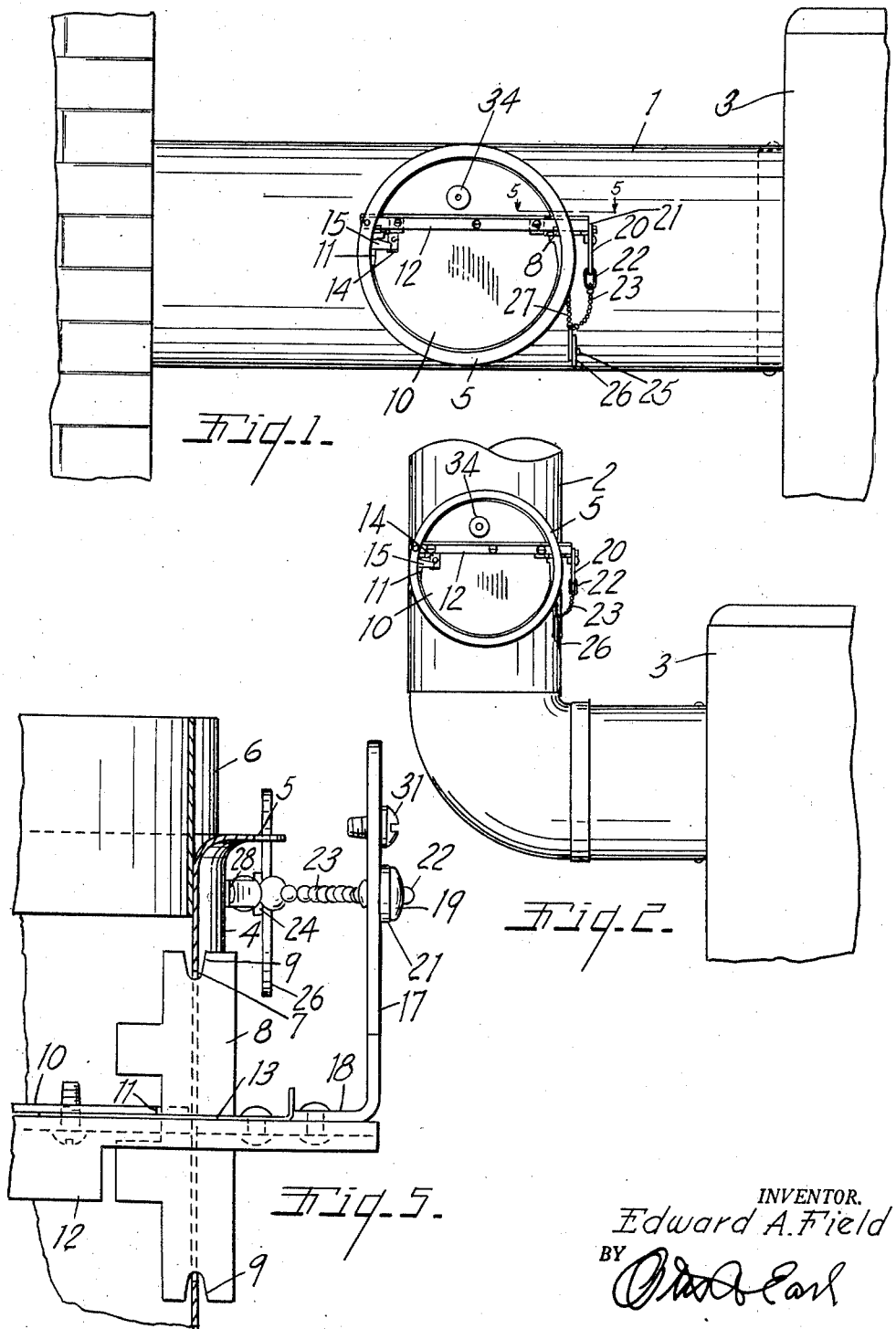
INVENTOR.
Edward A. Field
BY
ATTORNEY.

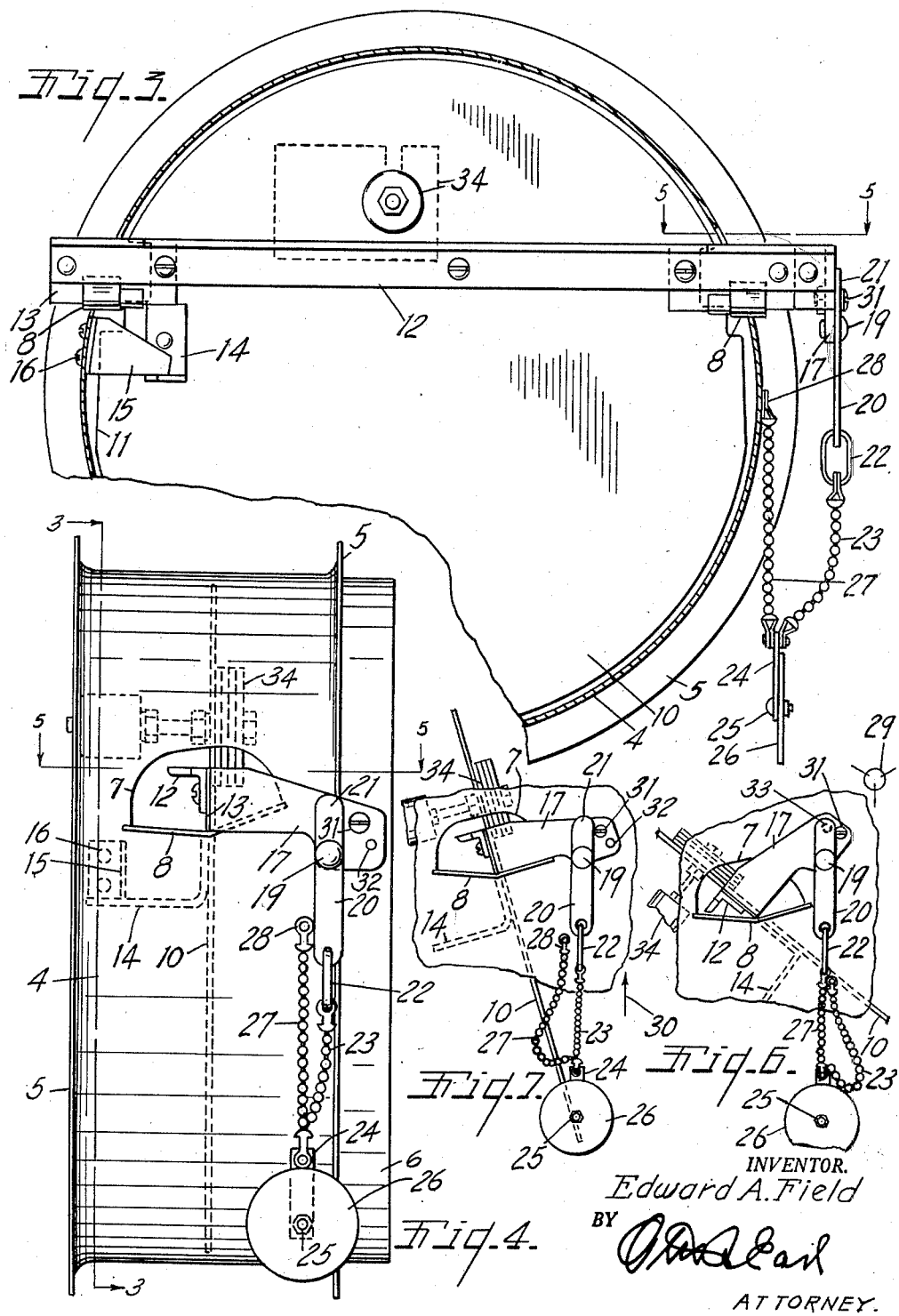

United States Patent Office 2,819,024
Patented Jan. 7, 1958

---

2,819,024

VARIABLY COUNTERBALANCED DRAFT REGULATOR GATE

Edward A. Field, Mendota, Ill.; Amy Field and City National Bank and Trust Company of Chicago, executors of the will of said Edward A. Field, deceased Application January 15, 1957, Serial No. 634,343

7 Claims. (Cl. 236—45)

This invention relates to improvements in variably counter-balanced draft regulator gate. The principal objects of this invention are:

First, to provide a draft regulator that is selectively connectable to vertically and horizontally extending flues for automatically regulating the draft in the flues which regulator is simple and inexpensive to construct and which can be readily adjusted to change the closing torque applied to the gate of the regulator in the selected installed position of the regulator.

Second, to provide a draft regulator having a counterbalance weight pendently supported from its gate operating arm and provided with adjustable stops engageable with a rigid portion of the pendent support at different tilted positions of the gate to apply different counter-balancing forces to the gate.

Third, to provide a draft regulator in which the counter-balance weight is suspended from a pivotally supported rigid link and in which a stop selectively engageable with the torque arm of the regulator is positioned to engage the rigid link in different adjusted positions of the gate and the link.

Fourth, to provide a draft regulator which can be inexpensively manufactured and readily adjusted for both inward and outward swinging motion or for inward swinging motion only relative to a flue in which it is mounted with the counter-balancing force applied to the gate being further adjustable to adapt the regulator for use in vertical or horizontal flues.

Other objects and advantages of the invention will be apparent from a consideration of the following description and claims.

The drawings, of which there are two sheets, illustrate a highly practical form of the regulator and two differently adjusted installations thereof.

Fig. 1 is a front elevational view of the regulator as mounted on a horizontally extending furnace flue.

Fig. 2 is a front view of the regulator mounted on a vertically extending flue.

Fig. 3 is a fragmentary transverse cross sectional view through the regulator housing taken along the plane of the line 3—3 in Fig. 4.

Fig. 4 is a side elevational view of the regulator with its gate closed.

Fig. 5 is a fragmentary horizontal cross sectional view taken along the plane of the line 5—5 in Figs. 1, 3 and 4.

Fig. 6 is a fragmentary side elevational view of the regulator adjusted for mounting in a horizontally extending furnace flue with the gate in partially open position.

Fig. 7 is a fragmentary side elevational view showing the regulator adjusted for mounting in a vertically extending flue.

The regulator and the automatic and adjustable controls therefor which constitute the present invention are improvements on the draft regulator disclosed and claimed in my co-pending application for barometric draft regulator, Serial No. 461,375, filed October 11, 1954. In that application it is disclosed that automatic barometric draft regulators for furnace flues are subjected to different conditions and therefore should have different counter-balancing weights when mounted in vertically or horizontally extending furnace flues. The present invention provides a regulator which can be mounted in a horizontal flue 1 or a vertical flue 2 extending from a furnace 3. The regulator as is disclosed more clearly in Figs. 3, 4 and 5 consists of a cylindrical sheet metal housing 4 having outwardly turned stiffening flanges 5 on its ends. A cylindrical sleeve 6 is fitted into the rear end of the housing and secured thereto to form a connecting nipple for mounting the housing on the flue pipe. The side walls of the housing above the horizontal diameter thereof define irregularly shaped openings 7 having V-shaped lower edges on which the upwardly opening V-shaped bearing seats 8 are supported. The ends of the bearing seats have notches 9 formed therein to straddle the adjacent edges of the openings 7 and rockably retain the bearing seats in position. Desirably the bearing seats 8 are of hardened wear resistant material.

Positioned within the housing 4 is a generally circular damper or gate 10 having its side edges cut away as at 11 so that the gate can tilt substantially within the housing. A support bar 12 of angled cross section is secured in chordal relation across the upper portion of the gate and projects through the openings 7. Hardened knife edges plates 13 secured to the ends of the support bar rest in the V-shaped bearing seat to tiltably support the gate. An angled arm 14 is secured to the outer side of the gate and projects forwardly therefrom to engage a stop bracket 15 in the closed position of the gate when it is desired to prevent outward swinging motion of the lower portion of the gate. However, the bracket 15 is removably secured to the housing 4 by screws 16 and can be removed when it is desired to permit both inward and outward opening motion of the gate.

The structure for controlling the swinging motion of the gate in response to different barometric pressures in the flue 1 consists of a torque arm 17 having a laterally turned end 18 secured to the support bar 12 as is best illustrated in Fig. 5. The torque arm projects rearwardly toward the flue from the front end of the housing and carries a shouldered pivot pin 19 positioned eccentrically to the edge of the pivot axis of the gate along the knife edges 13. Desirably the pivot pin 19 is located generally rearwardly from and somewhat below the pivot axis of the gate. Location of the pivot pin along a line extending from the knife edge and 8° below the horizontal has been found to be very satisfactory in practical installations of the regulator. The pivot pin 19 pivotally supports a rigid link or pendent 20 that thus is movable bodily about the pivot axis of the gate and swingable angularly on the arm about the pivot 19. The pendent link has an upwardly projecting end 21 extending above the pivot 19.

Connected to the lower end of the pendent link 20 by a ring 22 and chain 23 is a weight holder 24. The holder 24 carries a bolt 25 by means of which one or more counter-balancing weights 26 may be connected to the chain and the torque arm. Desirably but not necessarily a second chain 27 is connected to the holder 24 and extended upwardly to a fixed anchor 28 on the side of the housing to support the weight 26 independently of the torque arm when the gate is in closed position as shown in Figs. 3 and 4. When the stop bracket 15 is in place the second chain 27 is largely unnecessary as the gate will not swing outwardly at the bottom. However, when the bracket 15 is removed the chain 27 functions to relieve the torque arm 17 of the effect of the counterbalancing weight 26 when the gate swings outwardly.

The operation of the counter-balancing weight is shown more clearly in Figs. 6 and 7. Fig. 6 shows an installation of the regulator in a horizontal flue in which the combustion gases will flow parallel to the pivot axis of the gate as indicated by the end view of the arrow illustrated conventionally at 29. In Fig. 7 the regulator is adjusted for connection to a vertical flue in which the combustion gases will flow transversely with respect to the pivot axis of the gate as indicated by the arrow 30. In the horizontal installation shown in Fig. 6 the gate will swing inwardly against the substantially constant torque applied by the counter-weight for an angular distance of about 50°. The pendent link 20 naturally remains vertical throughout this movement. At this point in the swinging motion of the gate and torque arm, the upper projecting portion 21 of the pendent link engages the head of a stop 31 that is selectively positioned in the lower hole 32 of two holes 32 and 33 in the torque arm. The stop 31 prevents further swinging of the pendent link about the pivot 19 so that the link in effect becomes rigid on the torque arm and further inward swinging motion of the gate causes the weight 26 to be suspended from the lower end of the pendent link at an increased radial distance from the pivot axis of the gate. Thus as the gate is swung further open, its opening motion is resisted by a higher torque.

Due to the difference in effect of the flue gases in horizontal and vertical flues on a barometric regulator as explained in my previously mentioned co-pending application, it is highly desirable to have different returning torques applied to the gate when installed on a vertical flue. As shown in Fig. 7 the stop 31 is moved to the upper hole 33 in the torque arm when the regulator is installed on a vertical flue. This positions the stop further radially inwardly from the pivot axis of the gate and permits the gate to open inwardly to a substantially lesser angle approximating 20° with the balance weight and pendent 20 freely supported on the pivot pin 19 before the pendent link engages the stop 31. Further inward swinging motion of the gate is then opposed by the counterweight acting from the rigid lower end of the pendent link but due to the lesser swinging motion of the pendent link relative to the torque arm the lower end of the pendent link and the effective length of the counterweight torque arm is thus further from the pivot axis of the gate as shown in Fig. 7 than it is in Fig. 6.

In either adjusted position of the regulator the gate 10 is provided with a balance weight assembly 34 that is adjusted to balance the weight of the gate and the chains 23 and 27 but not the holder 24 and the counterweight 26 in the closed position of the gate. The gate thus swings freely in the housing subject only to the barometric pressures applied thereto and to the restraining torques created by the holder 24 and counterweight 26 as described.

Having thus described the invention, what is claimed as new and is desired to be secured by Letters Patent is:

1. A draft regulator comprising a housing adapted to be connected to a flue, a gate pivotally mounted within said housing for tilting movement on a horizontal axis, a torque arm connected to said gate exteriorly of said housing for vertical swinging movement about the pivot axis of the gate, a link pivotally mounted on said torque arm in laterally spaced relation to the pivot axis of the gate and having a portion projecting above its pivot connection to said torque arm, a weight swingably suspended from said link, and a stop adjustably positionable on said torque arm to be engaged by the portion of said link projecting above its pivot connection to said torque arm at predetermined points in the swinging movement of the torque arm, the link after such engagement constituting an extension of said torque arm.

2. A draft regulator comprising a housing adapted to be connected to a flue, a gate pivotally mounted within said housing for tilting movement on a horizontal axis, a torque arm connected to said gate exteriorly of said housing for vertical swinging movement about the pivot axis of the gate, a link pivotally mounted on said torque arm in laterally spaced relation to the pivot axis of the gate, a weight swingably suspended from said link, and a stop adjustably positionable on said torque arm to be engaged by said link at predetermined points in the swinging movement of the torque arm, the link after such engagement constituting an extension of said torque arm.

3. A draft regulator comprising a housing adapted to be connected to a flue, a gate pivotally mounted within said housing for tilting movement on a horizontal axis, a torque arm connected to said gate exteriorly of said housing for vertical swinging movement about the pivot axis of the gate, a link pivotally mounted on said torque arm in laterally spaced relation to the pivot axis of the gate, a weight swingably suspended from said link, and a stop positionable on said torque arm to be engaged by said link at a predetermined point in the swinging movement of the torque arm, the link after such engagement constituting an extension of said torque arm.

4. A draft regulator comprising a cylindrical housing adapted to be connected to a horizontally or to a vertically extending flue, a generally circular gate positioned in said housing and having its side edges cut away to permit tilting in the housing, a cross bar secured to said gate eccentrically of its center and projecting through said housing, bearings supporting said cross bar in said housing, a torque arm connected to said gate and positioned exteriorly of said housing and projecting generally laterally therefrom in the closed position of the gate, a pivot on said arm positioned in laterally spaced relation to the pivot axis of the gate, a rigid pendent link swingably supported on said pivot, a counter-balance weight swingably supported from the lower end of said link, a stop, means for selectively connecting said stop to said arm in plural positions spaced radially differently from said pivot and in the path of said link as it swings about its pivot, and other weight means connected to said gate eccentrically of its pivot axis and balancing the gate in the closed position of the gate.

5. A draft regulator comprising a housing adapted to be connected to a horizontally or to a vertically extending flue, a gate positioned in said housing and tiltable in the housing, a torque arm connected to said gate exteriorly of said housing and projecting generally horizontally in the closed position of the gate, a pivot on said arm positioned in laterally spaced relation to the pivot axis of the gate, a rigid pendent link swingably supported on said pivot, a counterbalance weight supported from the lower end of said link, a stop, means for selectively connecting said stop to said arm in plural positions spaced radially from said pivot and in the path of said link as it swings about its pivot, and other weight means connected to said gate eccentrically of its pivot axis and balancing the gate exclusive of said first weight.

6. In a draft regulator having a gate swingable in a housing about an axis that is off center with respect to the center of area of the gate, a torque arm secured to the gate to project generally horizontally in the closed position of the gate, a weight swingably supported by said arm to swing in an arc about a point spaced from the pivot axis of said gate, adjustable stop means coacting between said arm and the support for said weight to limit swing of the weight relative to the arm at predetermined points in the swinging motion of the weight, and other weight means balancing said gate exclusive of said first weight in closed position of the gate.

7. In a draft regulator having a gate swingable in a housing about an axis that is off center with respect to the center of area of the gate, a torque arm secured to the gate to project generally horizontally in the closed position of the gate, a weight swingably supported by said arm to swing in an arc about a point spaced from the pivot axis of said gate, stop means coacting between said arm and the support for said weight to limit swing of the weight relative to the arm at a predetermined point in the swinging motion of the weight, and other weight means balancing said gate exclusively of said first weight.

References Cited in the file of this patent

UNITED STATES PATENTS

| | | |
|---|---|---|
| 1,292,132 | Stoltenberg | Jan. 21, 1919 |
| 2,519,583 | Kresta | Aug. 22, 1950 |
| 2,650,029 | Field | Aug. 25, 1953 |